US006873610B1

(12) United States Patent
Noever

(10) Patent No.: US 6,873,610 B1
(45) Date of Patent: Mar. 29, 2005

(54) SYSTEM AND METHOD FOR EFFICIENTLY ACCESSING AFFILIATED NETWORK ADDRESSES FROM A WIRELESS DEVICE

(75) Inventor: David Anthony Noever, Huntsville, AL (US)

(73) Assignee: Mobular Technologies, Inc., Huntsville, AL (US)

( * ) Notice: Subject to any disclaimer, the term of this patent is extended or adjusted under 35 U.S.C. 154(b) by 763 days.

(21) Appl. No.: 09/846,747

(22) Filed: May 1, 2001

Related U.S. Application Data

(60) Provisional application No. 60/200,916, filed on May 1, 2000.

(51) Int. Cl.[7] .............................. H04Q 7/00; G06F 15/16
(52) U.S. Cl. ....................... 370/338; 370/351; 370/401; 707/10; 709/217; 709/229
(58) Field of Search ................................ 370/254, 255, 370/310, 338, 349, 351, 352, 389, 401, 465; 345/564, 565; 707/2, 10; 709/201, 202, 203, 217, 218, 219, 220, 223, 224, 225, 227, 229, 249, 250; 711/1, 100, 111, 154; 712/1, 28, 29, 220, 225

(56) References Cited

U.S. PATENT DOCUMENTS

| | | | |
|---|---|---|---|
| 5,483,631 A | 1/1996 | Nagai et al. | 395/155 |
| 5,500,929 A | 3/1996 | Dickinson | 395/160 |
| 5,515,487 A | 5/1996 | Beaudet et al. | 395/140 |
| 5,559,955 A | 9/1996 | Dev et al. | 395/182.02 |
| 5,615,346 A | 3/1997 | Gerken | 395/341 |

(List continued on next page.)

OTHER PUBLICATIONS

Dawson, C.W., et al. Automatic Classification of Office Documents: Review of Available Methods and Technique. Records Management Quarterly, Oct. 1995. pp. 3–18.

(List continued on next page.)

*Primary Examiner*—Alpus H. Hsu
(74) *Attorney, Agent, or Firm*—Russell Carter Gache Sirote & Permutt, PC

(57) ABSTRACT

A system and method for a wireless device to efficiently access affiliated addresses across linked topical communities, such as an Internet WebRing, through a wireless gateway. The invention includes a processing unit running on a wireless device controlled by an affiliated address control program. The processing unit includes a processing unit with a subject processor, a program store for holding an apparatus control program, a network address sub-processor, an address array referrer, an input mechanism, a display device for selecting retrieved affiliated addresses, and a high speed memory for holding site address selectors and associated content buffer. The wireless device communicates with a network via conventional wireless communication means which provides a path for updating the content buffer and array referrer, as well as transference of other types of sensory data. Means for predicting search failures is also integrated into the apparatus control program of the processing unit. Data received from the wireless gateway is statistically preprocessed then supplied to a processor called a network address sub-processor. The system then incorporates sorted affiliated addresses into the system on the wireless device to make possible a real-time detector system for a wireless device accessing content through a wireless gateway. The system may be offered as a service benefit for wireless device subscription or as a per occurrence chargeable item for a wireless subscriber. The system relieves the standard "hit-or-miss" method for affiliated address selection and site address storage and retrieval.

32 Claims, 3 Drawing Sheets

U.S. PATENT DOCUMENTS

| | | | |
|---|---|---|---|
| 5,625,781 A | | 4/1997 | Cline et al. ................. 395/335 |
| 5,652,751 A | * | 7/1997 | Sharony .................... 370/227 |
| 5,706,507 A | | 1/1998 | Schloss ...................... 395/615 |
| 5,727,156 A | | 3/1998 | Herr-Hoyman et al. ..................... 395/200.49 |
| 5,742,768 A | | 4/1998 | Gennaro et al. ........ 295/200.33 |
| 5,751,962 A | | 5/1998 | Fanshier et al. ........ 395/200.53 |
| 5,751,965 A | | 5/1998 | Mayo et al. ........... 395/200.54 |
| 5,752,042 A | | 5/1998 | Cole et al. ................... 395/712 |
| 5,768,511 A | | 6/1998 | Galvin et al. .......... 395/200.33 |
| 5,778,367 A | | 7/1998 | Wesinger, Jr. et al. ........ 707/10 |
| 5,781,189 A | | 7/1998 | Holleran et al. ............. 345/335 |
| 5,790,548 A | * | 8/1998 | Sistanizadeh et al. ....... 370/401 |
| 5,801,702 A | | 9/1998 | Dolan et al. ................ 345/357 |
| 5,813,007 A | | 9/1998 | Nielsen ....................... 707/10 |
| 5,821,927 A | | 10/1998 | Gong .......................... 345/335 |
| 5,864,676 A | | 1/1999 | Beer et al. ............. 395/200.59 |
| 6,041,360 A | | 3/2000 | Himmel et al. ............. 709/245 |
| 6,141,347 A | * | 10/2000 | Shaughnessy et al. ...... 370/390 |
| 6,233,618 B1 | * | 5/2001 | Shannon .................... 709/229 |
| 6,353,620 B1 | * | 3/2002 | Sallberg et al. ............. 370/465 |
| 6,487,602 B1 | * | 11/2002 | Thakker ..................... 709/230 |
| 6,791,974 B1 | * | 9/2004 | Greenberg ................. 370/352 |
| 2002/0075844 A1 | * | 6/2002 | Hagen ........................ 370/351 |

OTHER PUBLICATIONS

Meadow, Charles T. "Address data Information Retrieval System [San Diego, CA]." Academic Press 1992.

* cited by examiner

SYSTEM AND METHOD FOR EFFICIENTLY ACCESSING AFFILIATED NETWORK ADDRESSES FROM A WIRELESS DEVICE

This application claims the benefit of filing priority under 35 U.S.C. §119 and 37 C.F.R. §1.78 of the co-pending U.S. Provisional Application Ser. No. 60/200,916 filed May 1, 2000, for a Method And Apparatus For Affiliating Internet Addresses Into A Wireless Network. All information disclosed in that prior pending provisional application is incorporated herein by reference.

FIELD OF THE INVENTION

The present invention relates generally to wireless gateways and devices accessing the same. In particular, the present invention relates to wireless devices having means for accessing selected information across wireless network gateways. In greater particularly, the present invention relates to affiliating Internet address sites into wireless networks and devices.

BACKGROUND OF THE INVENTION

A wireless gateway manages various networks and devices, including the development and maintenance of customized forms applications, to make them practicably accessible to a subscribing wireless device, as well as making available network content such as images, video and audio files from content sources such as the Internet, an intranet, search engine services, etc. Wireless gateways attempt also to make the process as seamless as possible for a wireless subscriber so that the available set of resources are readily retrievable by the wireless device. In some wireless gateways, specific subjects are even associated with network resources, sites, pages, devices, images, video/audio files, etc. to facilitate retrieval. An example of this type of "friendly" wireless gateway would be a "WAP Gateway" which supports the WAP (Wireless Application Protocol), and which runs on Windows NT and other server platforms. The WAP Gateway is designed to interoperate with existing and future mobile systems to provide a wide-range of services.

In an effort to make like topical information more accessible, a new navigational linkage and association system on the World Wide Web ("Web") called "WebRings" has become favored. A WebRing is a set of linked Internet Web sites, enabled by a sign-up or opt-in procedure, that is usually topic specific and overseen by an administer called a "ringmaster." The ringmaster usually uses a common gateway interface to administer the WebRing and to facilitate one WebRing being linked to other WebRings to create vertical communities. WebRings are loosely defined as a group of affiliated address sites, since they typically are topic associated. Other methods of associating a group of Web sites, whether by a common topic or other basis, are in essence simply a set of affiliated Internet addresses.

A major drawback in wireless gateways is their inability to provide cross-topic searching within WebRing sites, or to provide a navigation system across network addresses for efficiently accessing different file-types, recently updated site content, and new WebRing participants. Another major drawback of wireless gateways is their inability to allow previews of content within a particular topic or previews of search results when searching within a WebRing through a dynamic navigation device. Although there is virtually no category that will not be accepted for WebRings, it is still not simple to navigate between sites, despite the claims of WebRing companies, such as Yahoo™, principally because of the single membership event that lacks follow-on updating information events, a lack of indexing within a given WebRing, and also due to the rapid size and growth rate of the Internet WebRings themselves.

In the past, searching particular WebRing organizations or combinations of affiliated Internet addresses, sometimes referred to as meta-organizations, posed problems. In particular, the length of the databases to affiliate new Internet address sites in a selected WebRing was unwieldy. Presently 80,000 rings and nearly 500,000 Internet sites are tied together for some WebRing categories. The main drawback of using standard methods to select affiliated Internet addresses into a wireless network is the apparent large number of site address "selectors" (e.g. a named hyper-link to a retrieved site) that cannot be readily handled without sophisticated computer methods. As an example, for an average affiliating Internet address of 20 site address selectors on 8 different ranking methods, the number of unique rank orders is more than a billion billion ($\sim 10^{18}$). This high variability of possible affiliating of Internet address data precludes using anything but a crude rule of thumb process to classify Internet addresses that do not satisfy a subscriber's true search objectives.

With today's new network speeds and access speeds, the problems have shifted to be predominantly organization and navigation related. But, with broad-band Internet access and other telecommunications options, wireless device access (e.g. a network terminal) holds considerable commercial promise for performing affiliated Internet site navigation and for supplying subscribers a desirable site address, even before actually performing topic or category searches.

Previous attempts to provide wireless search information can be summarized as relying on non-quantitative rules of thumb to produce qualitatively ranked search results. No current method exists to give a wireless apparatus the capability for holding affiliated Internet addresses in local storage for retrieval or for producing search results based on affiliated Internet addresses in a wireless gateway database. The principal failure of previous attempts to correlate site address data with a subscriber's information needs has centered on complex coupling patterns which determine affiliated Internet addresses in a "failure" mode. No prior pattern classification system has properly identified a set of factors that select site addresses, nor has any combination of factors been placed on affiliated wireless apparatuses.

The commercialization potential for a practical affiliating Internet address system for wireless gateways is more significant since the organizers for the wireless network are regularly content definers in complex addresses affiliating environments, including ever increasing customer needs. For example, complications can include low to high rankings for affiliated address storage and retrieval, incomplete coverage of a topic area, advanced address data formation, irrelevant content, and new file-types on a heterogeneous network. In cases in which considerable personnel time and customer money has been committed to established an address storage and retrieval topology and static mechanisms for affiliated address selection, the early detection of problems in affiliating addresses before costs are committed is commercially attractive.

Therefore, what is needed is a system and process for calculating search computational reliability for wireless systems that could superimpose objective rankings on affiliating Internet addresses into search data and thereby offer a method for evaluating navigation viability and computa-

SUMMARY OF THE INVENTION

It is the object of the present invention to provide an system, in which the affiliated network addresses includes a subject processor.

It is a further object of the invention to provide a system and method to generate and maintain a network address list across diverse categories of Internet content to the preview of site content and the navigation between content types for a wireless apparatus.

It is yet another object of the invention to determine whether an affiliated Internet addresses conforms to accepted abnormality parameters to predict potential navigation outcomes.

It is an even further object of the invention to provide a content buffer and storage system for address locations on a wireless apparatus.

In summary, the invention is a processing unit running on a wireless device. The processing unit includes a processing unit with a subject processor, a program store for holding an apparatus control program, a network address sub-processor, an address array referrer, an input mechanism, and a display device for selecting retrieved affiliated addresses, and a high speed memory for holding site address selectors and associated content buffer. The wireless device is in communication with a wireless gateway and an associated network that provides a means for updating the content buffer and array referrer, as well as transference of other types of sensory data. Means for predicting searching/navigation failures is also integrated into the apparatus control program of the processing unit. Data received from the wireless gateway is statistically preprocessed then supplied to a processor called a network address sub-processor. The system then incorporates sorted affiliated addresses into the system on the wireless device to make possible a real-time detector system for a wireless device accessing content through a wireless gateway. The system may be offered as a service benefit for wireless device subscription or as a per occurrence chargeable item for a wireless subscriber. The system relieves the standard "hit-or-miss" method for affiliated address selection and site address storage and retrieval.

Other features and objects and advantages of the present invention will become apparent from a reading of the following description as well as a study of the appended drawings.

BRIEF DESCRIPTION OF THE DRAWINGS

A system incorporating the features of the invention is depicted in the attached drawings which form a portion of the disclosure and wherein.

DESCRIPTION OF THE PREFERRED EMBODIMENTS

Figure 1:
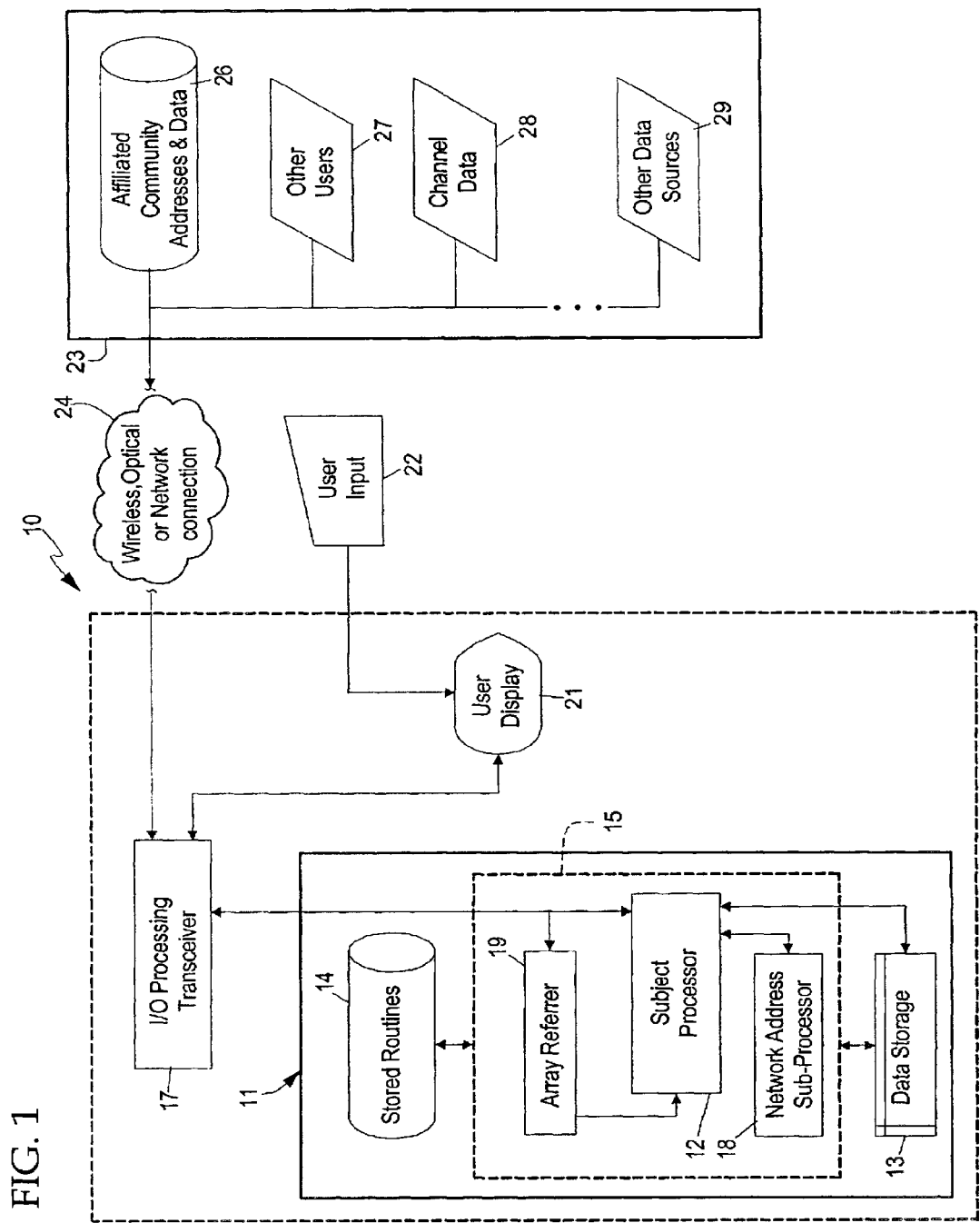
FIG. 1 shows a top level element diagram of the system.

To provide a better understanding of the invention, providing some background features and structure of the invention is beneficial for a complete understanding of the present system. The present invention includes a method for affiliating Internet addresses into a wireless network by identifying subtle patterns that are not otherwise detectable and incorporating that pattern data into the affiliated addresses. A network address sub-processor is incorporated into the wireless device for accessing the wireless network and serves as a navigator by presenting forward, backward, and random access buttons to a user to navigate within a WebRing or other affiliated set of sites. The network address sub-processor is also used to record actual sets of user affiliating Internet address cases, then subsequently generalized to select affiliating Internet addresses never before seen by the network. The result represents a robust selector apparatus for affiliating Internet addresses into wireless network site address selectors and address storage and retrieval, which depends on a user's affiliating Internet address data only. When demonstrated on the affiliating Internet addresses ordered to date, the preliminary results from the network address sub-processor show a 100% classification success with no false alarms on site address selector and >95% classification on the number of site address selectors or affiliating Internet address "address storage and retrieval". Because of its simplicity, this embodiment allows a small requirement for electronic data acquisition and storage and thus makes data record affiliating of Internet addresses a realizable outcome.

This innovation further offers an immediate determination of the practicality of a given affiliating Internet addresses into a wireless network, in an effort to save capacity on an existing network or improving customer satisfaction. At a high average cost for affiliating Internet addresses into a wireless network, at an operating volume of 1000/queries per minute for some premium Internet content, to reduce by half the losses due to poor affiliated addresses storage and retrieval would equal an improvement worth considerable value to the user and the network operator.

The system described herein for selecting affiliated addresses for storage and retrieval, along with a method for address selection, includes a combination of content buffer and storage for address locations in a wireless apparatus. The wireless apparatus includes an address navigator for forward, backward and random site selection. For example, the preferred embodiment of the present invention can be incorporated within personal cellular phones, including Nokia, Ericcson, Gte, Qualcomm, Motorola, and other mobile devices (family of handheld transmitters commercially available from primary or secondary phone distributors).

The identification data related to file-type, affiliated address locations, the file length and date, requires single-entry data on a simple "point-and-click" basis. Data received from the wireless gateway is statistically preprocessed, then supplied to a processor called a network address sub-processor. The system then incorporates sorted affiliated addresses into the system on the wireless device to make possible a real-time detector system for both in-house use or as a chargeable customer service produce, and relieves the otherwise constant "hit-or-miss" method for affiliated address selection and site address storage and retrieval.

The present invention includes a system and method for monitoring retrieved affiliated addresses to detect success or failure of retrieved individual addresses during search queries. Affiliating Internet address failures are herein defined as low-use affiliated addresses in a wireless network address storage and retrieval system, site address unavailability, subject preview unavailability, category unavailability or non-existence, problems with address storage and retrieval, or problems with selecting the site from the wireless devices input system, etc.

Current directory listings on network affiliated addresses follow various ad hoc or in some cases (Yahoo™), the Library of Congress classification system. The distribution is patchy, overlapping and reflects the opportunism that featured prominently in past directory developments. On most search services, almost half of the categories are divided more or less equally between subtopics that address news, reference, regional, society and arts, or health and biology. The rest are categorized by unique electronic or online subjects specific to a particular network interest, such as computers, games, education, online news, and business. A typical categorization scheme is shown below:

| Categories |
|---|
| Arts |
| Movies, Television, Music . . . |
| Business |
| Jobs, Industries, Investing . . . |
| Computers |
| Internet, Software, Hardware . . . |
| Games |
| Video Games, RPGs, Gambling . . . |
| Health |
| Fitness, Medicine, Alternative . . . |
| Home |
| Kids, Houses, Consumers . . . |
| News |
| Online, Media, Newspapers . . . |
| Recreation |
| Travel, Food, Outdoors, Humor . . . |
| Reference |
| Maps, Education, Libraries . . . |
| Regional |
| US, Canada, UK, Europe . . . |
| Science |
| Biology, Psychology, Physics . . . |
| Shopping |
| Autos, Clothing, Gifts . . . |
| Society |
| People, Religion, Issues . . . |
| Sports |
| Baseball, Soccer, Basketball . . . |
| World |
| Deutsche, Español, Svenska . . . |

These common search classes can be categorized for affiliated network addresses into the following targets: industries, regional and shopping, news channels, and unknowns. A preferred method employed for categorization in the present invention is for the user to customize the categories or filing scheme according to their own interests or, alternatively, the system can automate this categorization process by analyzing the history of a user's navigation through affiliated addresses. Further, a rating apparatus for user satisfaction, or some default criterion, such as number of revisited categories over a rating period of time can be employed to automatically categorize inputs.

Referring to the drawings for a better understanding of the function and structure of the invention 10, a system and method for accessing affiliated addresses from a wireless gateway and associated network is shown in FIG. 1. The system 10 has the primary elements of a processing unit 11 having a processing subsection 15, memory 13, and stored programs 14 including a wireless affiliated address control program 16; an input-output device 17, including a wireless transceiver; and an output device 21, such as a display. The processing subsection 15 is operatively coupled to the data memory 13 and program memory 14 and includes a subject processor 12 operatively connected to a network address sub-processor 18 implemented as a hard-wired set of processing elements or as software, and an array referrer 19. Data storage element 13 also acts as a buffer memory for received content associated with received affiliated address data. Retention of associated content allows off-line navigation and accessing of site content for a user on a wireless device when out of communication with the gateway. Each processing element in the processing sub-section 15 including all processing operations required for the herein described methods may be made up of discrete processing components or implemented in pure software.

The processing unit 11 communicates to a user through the input-output processor 17 that provides a communications path for a data input source 23, such as a direct user input 22, and output 21 (e.g. a display). The apparatus 10 is preferably a portable unit which may be freely transported, attached to the belt of the user, strapped to the user, etc., but can also be implemented in a personal computer ("PC"), either as pure software or as discrete components such as may be found in an installed processing board of a PC. Inasmuch as I/O processing, display processing, user input communication electronics, and the electrical interconnection and implementation of discrete components are well understood, and inasmuch as these aspects are not necessary for an understanding of the invention, further discussion of these topics will be omitted.

In the preferred embodiment, the memory 17 for stored programs has approximately 12 kilobytes (KB) of random access memory (RAM), read-only memory (ROM), or similar storage including various so-called appliance or "flash" memory storage units. The processing subsection 15 is operatively coupled to the memory 14 and includes a subject processor 12 operatively connected to a network address sub-processor 18 implemented as a hard-wired set of processing elements, or as software. In the preferred embodiment, the subject processor generates a remote address locator for received affiliated address data using known remote address locator processing techniques, such as remote address locator methods implemented in hardware, software, or firmware, by using an integrated circuit known in the art as a "digital remote address locator" capable of performing a network address navigation, such as the TM-66 swiFFT Chip available from Texas Memory Systems, Inc., or as software known in the art such as built-in functions for Matlab Software (The MathWorks, Inc.) or in Nyhoff's FORTRAN 77 Numerical Methods For Scientists And Engineers (1995, Prentice Hall, N.J.).

The network address sub-processor 18 may employ an i80170NX chip, available from INTEL™ Corporation to interface digital or analog signals. Using the i80170NX chip, the network address sub-processor 18 may be cycled to produce displays from corresponding inputs in about 0.001 microseconds. The processor subsection 15 may also use other integrated circuits and circuit elements in conjunction with the subject processor 12 and the network address sub-processor 18. To calculate and correct output weight matrices, the network address sub-processor 18 may employ a Ni1000 network address sub-processor chip, available jointly from INTEL™ Corporation and Nestor, Inc. The network address sub-processor 18 may also employ a PCI bus and SIMD architecture on an installable computer processing board, available from Adaptive Solutions, Inc. The processing subsection 12 operates application software stored in memory 14 providing programs and subroutines implementing the disclosed methods for affiliating Internet addresses within a wireless device.

The system 10 performs the application programs and subroutines, such affiliating addresses into a wireless network control program described herein, which are implemented from compiled source code in the C programming languages and which may be downloaded to the processing subsection 12 from an external computer. Alternatively the compiled source code may be implemented in other programming languages such as Java, Pascal, Fortran, COBOL, etc. or scripting languages such as JavaScript, Python, Applescript, etc. Alternatively, the source code may be implemented in the processing subsection 12 as firmware, as an erasable read only memory (EPROM), etc. It will be understood by those skilled in the art that other object-oriented or visual programming languages such as C++ or J++ could be used to implement the disclosed system and method.

The processing subsection 12 receives affiliated address data from an input data source 23 through a data transfer device or channel via the wireless network gateway. The data may be received through a wired, optical, or a wireless connection 24 for electromagnetic transmissions, or alternatively may be transferable storage media, such as floppy disks, magnetic tapes, compact disks, or other storage media.

The system 10 includes a user interface having at least one button actuated by the user to input commands and to select from a plurality of operating modes. In alternative embodiments the device may include a keypad, keyboard, touch screen, a mouse, and/or a data reading device such as a disk drive for receiving the affiliating Internet address data in input data files from storage media such as a floppy disk, compressed formats, or an 8 mm storage tape. The system 10 may alternatively include connections to other systems as affiliated address data sources. The received affiliated address data is stored in memory 18 for further processing to generate a output set available via the wireless gateway, including warning, alert, selection, and/or other site address assessments. In addition, through the user display 21, the user may select the operating mode of the system 10 to generate a display of affiliated address selection data. In the preferred embodiment the system would include a visual interface for choosing a listed affiliated address on the display. The system includes at least one button which can be actuated by the user to input commands, and from sensor input data sources 29 is capable of receiving the affiliated address data from remote sensors.

The I/O Processing Transceiver 17 receives input for the system 10. It is also understood that alternative input sources may be used to receive commands from the user, such as wires to keypad, keyboard, touchscreens, mouse devices, and graphical user interfaces ("GUI") such as Windows™ available from Microsoft Corp. Other alternative input sources may include microphones for receiving audio voice commands, with the processing subsection 12 including speech or voice recognition devices and/or software known in the art to accept commands and to operate the processing subsection 12. In the preferred embodiment, the input source also includes external leads and/or input/display (I/O) ports; for example, wires to a sensor or devices transducer. Such sensors or transducers may be attached to the I/O Processing section 17, or alternatively may be implanted through the skin or within an orifice of a user for wireless remote communication with the system.

In an instrument-embedded embodiment of the system, the sensors chosen by the user are detected by the I/O Processing section 17 using a sensor or database entry, where the detected input causes the sensor to generate corresponding signals, such as electrical signals, which are then sent to the processing subsection 12 for processing. In another exemplary embodiment, a wireless network signal is detected by the sensor or transducer, used in conjunction with an optional parallel or serial data transfer for ensuring sufficient address navigation, with forward, backward and a random site selection button or remote address locator data for affiliating Internet addresses into a wireless network.

Alternatively, for sensors or transducers measuring voltages or other electromagnetic signals from the affiliating address analyzer, the optional serial or parallel data transfer port may employ direct cable, inter-networked connections such as Internet, world wide web interfaces, intranet, or extranet connections to ensure sufficient electrical or digital data transfer from the user and the sensor/transducer for measurement of such electromagnetic signals. One skilled in the art will understand that the transducer or other sensors as well as the wire may be transferring real-time, archived or stored historical data from the user, and other devices such as filters, statistical pre-processors, etc. may be used to secure sufficient data representation and wire or wireless transfer substantially providing the user inputs.

The input source may include additional sensors or transducers used for detecting an affiliating Internet address or voltage measurements of the user at various points in the manufacture, customization, remote address locator or application of affiliating Internet addresses into a wireless networking on a database of records. The affiliating Internet address for the user may be measured in units of address storage and retrieval (e.g. number of affiliated sites, or percentages), site address selector (e.g. ratio or percentage of successful to reinitiated Internet addresses selected on a wireless network), subject availability previewer across different categories of interest (e.g. online vs. offline availability systems on a wireless network); or paid vs. free subscription site address selectors, date, site address selector difficulty or site address selector (e.g. reading level of affiliating Internet addresses into a wireless network) detected from the user on a specified sampling schedule (i.e. slow or modes of sampling the progress for the user).

The system 10 may also include specialized programs such as a display graphics tool to display and/or print the generated display signals. Alternatively, the system 10 may include connections to other systems such as other offices or affiliated address network monitoring systems for display of the generated output signals thereto. In additional embodiments, the system 10 may store the generated display signals for later uploading through the system 10 to a separate display unit such computer having the capability to allow the user, or others to access the generated display signals.

In the preferred embodiment, the system 10 may include at least one illuminating indicator light, such as a red and/or green light or at least one light emitting diode (LED) of any color. Corresponding indicia associated with and substantially adjacent to the indicator light may be provided on the system 10.

In another example multiple indicator lights may be provided with corresponding network address subprocessors indicating a plurality of modes such as address navigation mode, allowing for forward, backward, and random site selection of displayed affiliated address selections through on-screen selection menus/buttons or external wireless device buttons, and a run (i.e. monitor) mode, and indicating a plurality of wireless configurations and indications, such as an indication of the affiliated address configuration within normal bounds, a suggestion to seek assistance, and an indication of calculated values being off of an internal scale (i.e. outside a range of acceptable values). In alternative embodiments, the system 10 may include at least one liquid crystal display (LCD) providing a variety of alphanumeric information, and may further include iconic information and graphical representations, such as time-series address storage and retrieval and site address selector plots and input address navigator, with forward, backward, and a random site selection button for the user to select. Such alphanumeric information displayed by the LCD may include mode indicators, in which words of any arbitrary language are displayed such as the English words "address navigator", with forward, backward and a random site selection button", "remote address locator", and "RUN". The display of "address navigator, with "forward, backward and a random site selection button" indicates that the system 10 is in address navigation mode, during which the system can iteratively processing the training input from the user to modify the address array referrer data to the nodes of the network address sub-processor 18. Other useful display messages are listed below:

The display of "REMOTE ADDRESS LOCATOR" indicates that the system 10 is in a remote address locator mode (i.e. determining that test data is within the predetermined error tolerance of the training data).

The display of "RUN" indicates that the system 10 is running (i.e. monitoring to detect for affiliated address abnormalities using the training data). Such alphanumeric information displayed by, the LCD may also include configuration indications, such as "NORMAL", "GET ASSISTANCE", and "OFF OF SCALE".

Other display readings may include "address storage and retrieval or site address selector, "OUT OF NORMAL BOUNDS", "CAUTION", "READING DATA AT THIS TIME", "BATTERY OK", "BATTERY NEEDS REPLACEMENT", "BATTERY CHARGING", "GO TO MAIN MENU", "RESET DISPLAY", "SPEED CONTROL FOR READINGS", AND "HIGHLIGHT CURRENT STATUS", where such readings are self-explanatory and/or intended to be intuitively understood by the user.

A "SPEED CONTROL FOR READINGS" indication on the LCD prompts the user to adjust the sampling rate of sensor/transducer inputs to slow or fast modes, with such adjustments implemented by the user using a button.

The "HIGHLIGHT CURRENT STATUS" indication is displayed when the user chooses to have the system 10 associate the current affiliated address or electrical input of the user to any of multiple classic problematic configurations, such as low address storage and retrieval with the name of the associated classic problem displayed on the LCD.

An affiliated address location and associated content preview along with a visual assessment indication for the user may also be displayed by the LCD. As affiliated address classes, the same categories can be classified into user-preferred bins, based on site address locations, address storage and retrieval, subject availability previewer across different categories of interest, subject availability and previewer availability across different categories of interest, remote address locator graphs and/or plots. Alternatively, the system 10 may include specialized graphics programs to convert the generated site address selection links to a displayed graphic. In additional embodiments, the generated display list may include address storage and retrieval site addresses listed in a file for display as columns or tables of address data by the system 10 which may be a display or a hardcopy printer.

Figure 2:
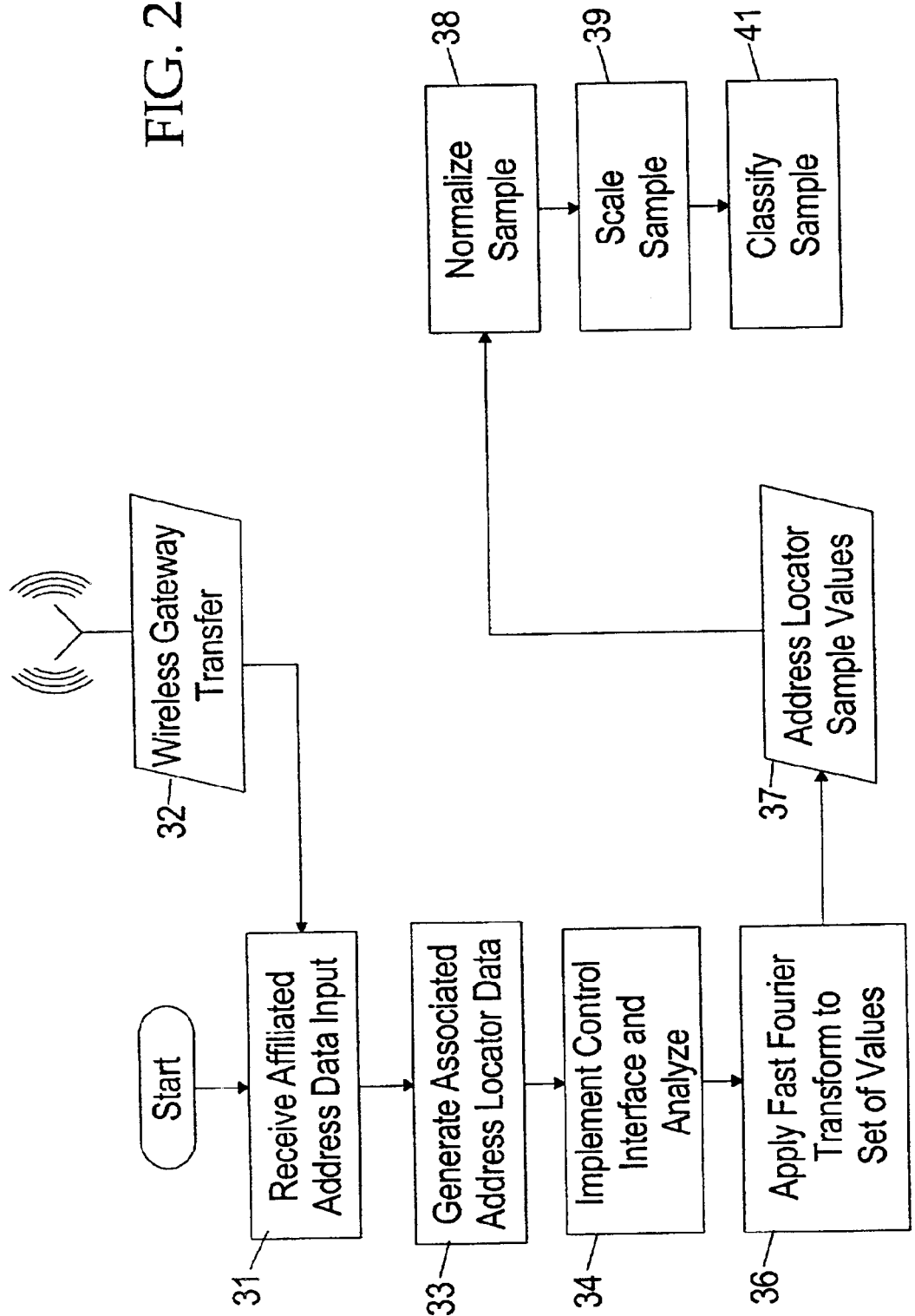
FIG. 2 is a processing flow diagram showing the functional steps of processing input affiliated address data; and, FIG. 3 is a processing flow diagram showing top level system operational steps for the invention.

Referring now to FIG. 2, the subject processor 12 of the processing subsection 12 implements known remote address locator methods to generate a remote address locator of the input affiliated address data 31,32. A common use of address control interfaces is to find the remote address locator components of a signal buried in a noisy time domain signal. In the preferred embodiment, the subject processor 12 processes the input affiliated address data from the input data source to obtain a remote address locator 33 (e.g. an address for a site). In the preferred embodiment, the subject processor 12 implements an address control interface 34 on the previous 2N values, such as 16, 32, or 64 previous values of the affiliated address data, which is analyzed using a standard Tukey Fourier Transform processing method known in the art. The previous 64 values are then processed by the FFT 36 to generate a sample of remote address locator values 37. The spectral analyzing functions may implement the transform and inverse transform pair given for vectors of length N by the following equation:

$$X(k) = \sum_{j=1}^{N} x(j)\omega_N^{(j-1)(k-1)}$$

$$x(j) = 1/N \sum_{k=1}^{N} X(k)\omega_N^{-(j-1)(k-1)}$$

Where $\omega_N = e^{(-2\pi i)/N}$ is an nth root of unity.

And, for a statistical analysis of data $\Delta(t)$ with remote address locator components, $\Delta(t)$, for times, t, the protocol for the subject processor 12 is represented by the following pseudo-code:

Statistical Analysis Procedure
begin
  t=0
  initialize D(t)
  normalize structures in D(t) and identify remote address locator components, $\omega(t)$;
  sample remote address locator components over a sampling interval;
  while termination configuration not satisfied, do
  begin
    t=t+1
    select D(t) from D(t−1) for scaling in amplitude and remote address locator coordinates;
    modify structures in D(t) by applying transform operators;
    evaluate structures in D(t)
  end
  initialize scaled sample to neural processors for classification
end.

The sample is then normalized 38 by the subject processor 12 to the maximum and minimum, values, and the subject processor 12 generates a scaled sample 39 length of $2\pi$ with a sampling interval of $2\pi/2N$, and a sampling remote address locator of the reciprocal of the sampling interval (i.e. $2N/(2\pi)$). The normalized scale then varies from 0 to 0.1 in scaled remote address locator coordinates and 0 to 1 (peak value) in scaled amplitude coordinates. The scaled sample is then provided to the network address sub-processor 18 for classification 41.

In alternative embodiments, the network address sub-processor 18 may use an additional nodes in content previewer to implement a maximum entropy spectrum algorithm ("MESA") to assign coefficients for estimating a least squared minimum deviation between the deconvoluted or inverted regressive spectrum and the real-time affiliated address data of the user. MESA may be used to produce a remote address locator independent of the sampling interval to provide an affiliated address selection which is not based on a fixed Fourier window for the sampling associated with the Nyquist limit for Fourier spectra. Such a selection via MESA may be obtained using a minimum of, for example, three previous readings to produce a substantially accurate Fourier address locator.

In the preferred embodiment, the network address sub-processor 18 includes content previewer, processing, and display layers, each having one or more units as processing elements with biases, and an address array referrer 19 which is modified during address navigation with forward, backward, random site selections of the network addresses managed by the sub-processor 18. For a number of inputs i(t) with an initially random weight matrix, M(t), for times, t, the protocol for network address sub-processor computations is represented by the following pseudo-code:

Network Address Sub-Processor Algorithm Procedure
begin
    t=0
    initialize inputs i(t) and address array referrer M(t)
    evaluate transfer function in outputs o(t) and identify errors, E(t);
    while termination configuration not satisfied, do
    begin
        t=t+1
        select W(t) from W(t−1) for adjustment
        modify structures in W(t) by applying error correctors;
        evaluate structures in o(t) by comparison to address navigator, with forward, backward and a random site selection button input from the user
    end
end.

In the preferred embodiment, the network address sub-processor 18 has one content previewer having three input nodes for receiving the remote address locator from the subject processor 12 at one input node, and for receiving affiliated address structural data such as probability density and affiliated address connectivity at the other two input nodes. One content previewer is included having two nodes, and one output layer is included having one display node. The display node provides a output as a mapping or a comparison of test data or real-time input data from address navigation input from the user, where the mapping is a wireless network address navigation map relationship embodied as a network address sub-processor configuration, through assistance from address array referrer 19 which is altered by historical navigation data from an address navigator managed by the network address sub-processor 18.

The subject processor 18 transmits its results to a weighting processor or, as referred to herein, a network address sub-processor 18, with the following implementable steps, for inputs x(t), weight matrix W(t), outputs y(t) and error function E(t)—all of which may vary with time (t) over the iterative steps of convergence. A threshold, for example, can be set to signal that the errors in the convergent iteration are sufficiently small, to end the recursion and display the results to $o(t=t_{final})$. In the preferred embodiment, the transfer function applied in each network address sub-processor node is the sigmoid function:

$$y_i = [1/(1+\exp(-\Sigma w_{ij} x_j + o_i))]$$

where $y_i$, $x_j$, are independent and dependent variables, respectively, and $o_i$, $w_{ij}$ are determined by iterative solution as the bias and weight functions, respectively. Alternative transfer functions such as Gaussian, linear, inverse sigmoidal, or centered logistic functions may also be applied to one or more unit alone or in combination. Furthermore, the output y, input x, and bias at the $i^{th}$ node, respectively, and $w_{ij}$ are the respective address array referrer 19 of the i-th node from each of j-th input connections. The overall configuration of the network address sub-processor 18 is a back propagation network processor, with a Delta Rule having Δ=1 as the learning rule used to train the network address sub-processor 18 by gradient descent, and with the root mean square (RMS) error of 10% as the learning tolerance. The network address sub-processor 18 is trained an arbitrarily large number of iterations, such as 30 billion iterations.

In additional embodiments, genetic optimization may be implemented using a genetic algorithm to assign node address array referrer values to each node and to update a cost function for optimal learning. For a population of solutions n(t) with performance or fitness, F(t), for times, t, the protocol for genetic optimization is represented by the following pseudo-code:

Genetic Algorithm Procedure
begin
    t=0
    initialize n(t)
    evaluate structures in n(t) and identify fitnesses, F(t);
    while termination configuration not satisfied, do
    begin
        t=t+1
        select n(t) from n(t−1) for competitive selection;
        modify structures in n(t) by applying genetic operators;
        evaluate structures in n(t)
    end
end.

Other configurations of the network address sub-processor 18 may be used to process the input data, including affiliated address data, and remote address locator information obtained therefrom. For example, the network address sub-processor 18 may have a plurality of input nodes for receiving input data such as raw time-series, affiliated addresses into a wireless network, site address selector, or address storage and retrieval signals; the FFT, spectral slope, the autoregressive moving average ("ARMA") coefficient, and the autocorrelation function ("ACF") of the time-series signals; quality content buffer and storage for address locations in a remote control; user or affiliated address history; user activity; user age; the time since the last alert by the system 10, and user prescribed bounds for the error tolerance.

The variation of the spectral slope in an inverse remote address locator, or inverse frequency distribution from linearity, according to predetermined error tolerances may be used by the network address sub-processor 18 to detect an abnormal affiliated address configuration. In the preferred embodiment, the output of the network address sub-processor 18 is a single binary value corresponding to logic 0 or logic 1, where logic 0 indicates that the current affiliated address configuration of the user is within 10% of the training bounds, while logic 1 indicates that the current affiliated address configuration of the user is outside 10% of the training bounds.

For the input and output of solutions n(t) with performance or fitness, F(t), for times, t, the protocol for applying non-binary or fuzzy logic transformations is represented by the following pseudo-code:

Fuzzy Transform Algorithm Procedure
begin
   t=0
   initialize n(t)
   evaluate structures in n(t) and identify fuzzy matrix values, L(t) while termination configuration not satisfied, do
   begin
      t=t+1
      select n(t) from n(t−1) for fuzzy transformation;
      modify structures in n(t) by applying fuzzy operators;
      evaluate structures in n(t)
   end
end.

The output binary or fuzzy logic values are used to activate the system display 21. For example, an LED activated by a transistor driven by the output binary or logic values could be activated. Or, a green light could be activated if a logic 0 is encountered indicating acceptable navigation activity, while a red light is activated if a logic 1 output from the network address sub-processor 18 might indicate an unacceptable navigation or search activity (e.g. an affiliated address abnormality detection). The activation of a red light or LED serves as an indication of an impending system failure.

The network address sub-processor 18 is trained with user navigation steps within a predetermined error as determined by a preselected stopping criteria. For example, a predetermined root mean square (RMS) error of the navigation activity input from the user iteratively passed through the processing network address sub-processor 18. The affiliated address data may include the affiliated address synthesis for address storage and retrieval or site address output to a user, obtained from the user from the selection inputs, where such affiliated address data are deemed normal during the address navigation. The apparatus for system 10 may include a personal address navigator managed by the network address sub-processor 18 that detects real-time affiliated address data of a user to categorized address data as similar or dissimilar to normal affiliated address data within an acceptable range of tolerance (i.e. within a the predetermined RMS error).

Accordingly, upon a determination of similarity of affiliated addresses, a logic 0 is generated by the network address sub-processor 18 to activate the green LED, while a determination of dissimilarity in affiliated address data, such as an affiliated address data spike due to the affiliated address failing or behaving abnormally, causes a logic 1 to be generated and output by the network address sub-processor 18 through the output node thereof to activate the red LED. As such, dissimilarity in the affiliated address data acts as a content buffer and storage for address locations in a remote control of affiliated address failures or other abnormalities, in which affiliated address data spikes stand out as disparities from the original normal affiliated address data used for address navigator. The network address sub-processor 18 selects such an event, with the red LED providing the user with an indication to seek further analyses or assistance. The network address sub-processor 18 may monitor a running address navigator to recognize each of multiple classical input measurement signatures for affiliated addresses, such as the low address storage and retrieval or site address selector, and then to classify the real-time input of a user input as similar to one of the address classical signatures. In such classification, the network address sub-processor 18 outputs a number or a series of numbers to at least one output node corresponding to trained classical signatures which are matched to the real-time input from the user input within the training bounds of the network address sub-processor 18. Additional post-network address sub-processor processing by software and/or by circuitry may be provided to output the name or other corresponding information of the matched classical signatures to an LCD of the system 10, as described above.

Figure 3:
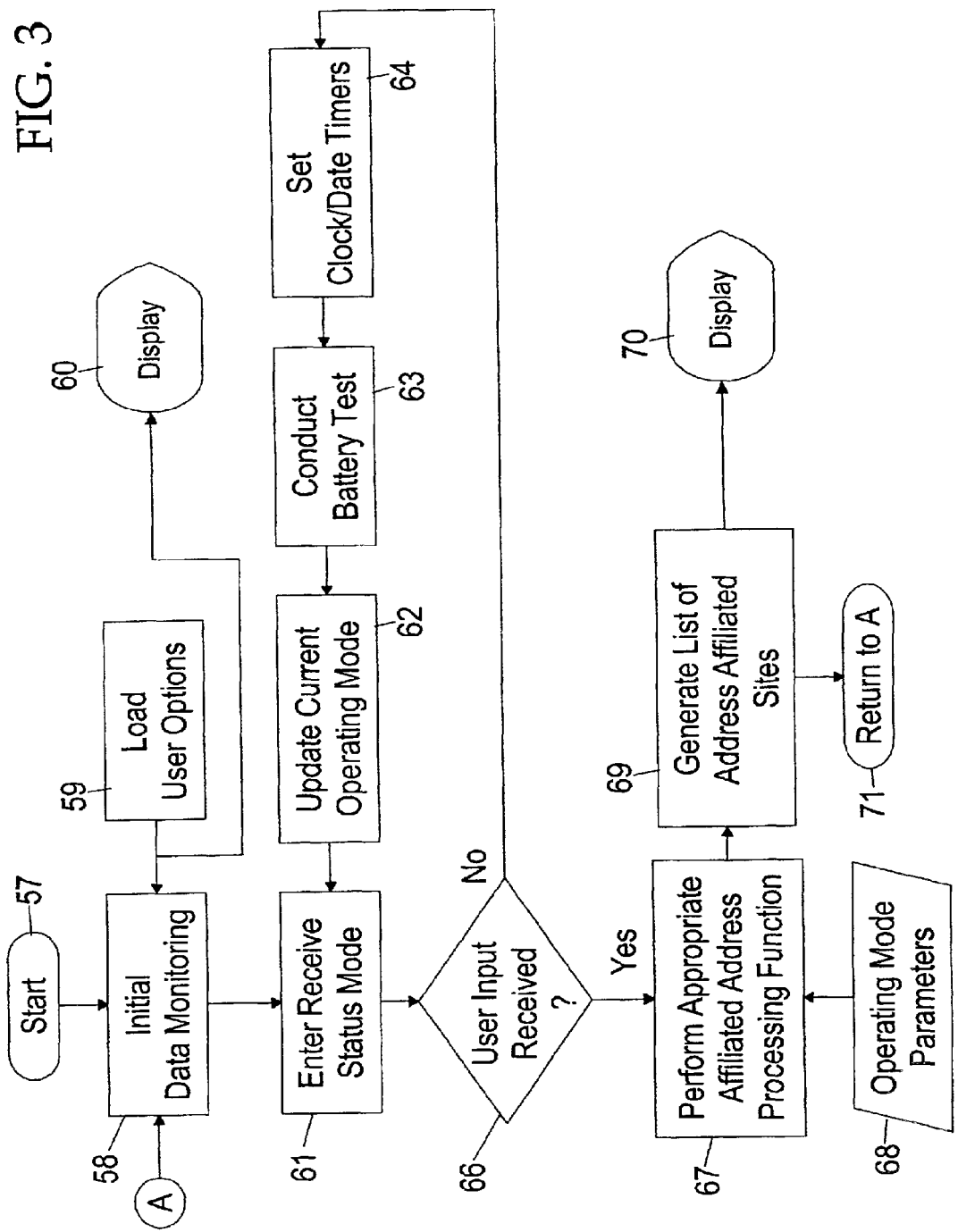

As shown in FIG. 3, the system 10 generates the display data resulting from the inputted affiliated address data processed by the system 10 through the wireless network control program, as described above. The system also includes an operating system control program for controlling mode and user interfacing. The system control program includes the steps of starting 57,58 the operation of the system 10, optionally indicating user options 59, such as displaying a user menu on an LCD 60; and waiting to receive 61 user input through the I/O processing section 17, including waiting for actuation of user buttons or waiting to receive input affiliated address data from a data source 23. As the system 10 waits 61, the current operating mode is updated 62. For example, if the system 10 is monitoring for affiliated address abnormalities it will display a "NORMAL BOUNDS" indication or a "SEEK ASSISTANCE" indication. This monitoring is continued as affiliated address data is received and as the current internal computational values are updated 62. The displayed indications are accordingly updated until the user inputs a user-selected command to enter another operating mode. In addition, as the system waits 61, routine tasks may also be performed such as testing the power source 63 to determine; for example, if the battery is low, and then outputting an indication through the display 21 of a low battery state.

Another routine task may be to update 64 various timers and/or counters of the system 10, such as timers employed to determine a twelve hour window of input affiliated address data, as described above for training. In alternative embodiments, the system 10 may be incorporated in a timepiece such as those known in the art and using the timers and/or counters to store and update in memory 13 and to display the current time, date, etc. through the display 21, with one of the buttons 22 input to the I/O processing section 17 allowing the user to set and adjust the current time in a manner known in the art.

While waiting (steps 61–66), the system 10 checks for a user input by polling the I/O processing section 17 or checking a register in which user-selected command signals are input through user buttons. Upon receipt of a user input signal 66 the system processes the user input to determine a corresponding operating mode selected by the user. The system 10 then performs the operations of the selected operating mode 67, including applying the proper algorithms, and generates display signals 69 to the display device 70 in the form of a list of affiliated address sites. The system then loops back 71 to perform recursive steps to regularly update the current values and the display signals in a predetermined computational cycle, such as 2–3 seconds, to provide a continuous monitoring of the system configurations for the user. The system performs the computational operations of the selected operating mode 68 according to the steps shown in FIG. 2 and as further described herein, in which the system 10 starts performing the selected operating mode to branch to implement one of several computations according to the selected system mode. It will also be understood that mode selection may be automatically selected by the system upon occurrence of a preselected event, such as upon initially turning the system on.

In response to repeated actuation of the buttons by the user, the system 10 may cycle through a cyclical group of modes. For example, a first actuation of the buttons causes the system to branch to other modes, a second actuation causes a branch to other buttons, a third actuation causes a branch, a fourth actuation causes a branch, etc. At the corresponding branching to other modes, a corresponding mode light shown in illuminated. Upon entering an address navigation mode, a mode light substantially adjacent the "ADDRESS NAVIGATOR" indicia is lit. Upon branching to other methods, the system 10 processes address navigation actions from the user to train the network address sub-processor 18 by, for example, iteratively passing the address navigator through the network address sub-processor 18 and modifying the address array referrer 19 of each node of the network address sub-processor 18 by processing or comparisons of the RMS error.

The mapping relationship may also be represented by the address array referrer 19 being trained by sub-processor 18 (i.e. the stored addresses in the array referrer found in the training data), and the address training data configuration may be stored in a memory associated with each node of the network address sub-processor 18. Alternatively, the address training data sub-processor configuration may be stored in the memory 13 for later retrieval and loading into the network address sub-processor 18. The system 10 may be used by multiple users, with an address training sub-processor configuration obtained from each user after address navigation training, and the system may hold such address training data sub-processor configurations for later access and use by a corresponding user without the need for re-training.

Upon branching, the system 10 enters a remote address locator mode to test that the network address sub-processor training is performing within a predetermined time and/or error range. Training may be completed or interrupted by the user, and initiation of an address locator mode allows the user to test whether the training of the network address sub-processor 18 is sufficient to monitor input data from the wireless gateway within the predetermined error tolerance, such as 10%. Upon another branch, the system 10 enters a running mode to monitor for system abnormalities using training sub-processor data (i.e. a network address sub-processor 18 having training data in its address array referrer from memory 13).

Entering the running mode includes the steps of receiving input affiliated address data, such as the user's data on affiliated addresses from a wireless gateway, address storage and retrieval of site address selectors, for about a two second input sampling interval; pre-processing the input affiliated address data using the subject processor 12 to obtain remote address locator data; inputting the remote address locator data into the address referrer 19; and generating display data from the subject processor 12 based upon stored training data using a wireless network address navigation map relationship. The processed data is then displayed to a user 17,21.

While I have shown my invention in one form, it will be obvious to those skilled in the art that it is not so limited but is susceptible of various changes and modifications without departing from the spirit thereof.

References
1. Dawson, C. W., et al. *Automatic Classification of Office Documents: Review of Available Methods and Technique.* Records Management Quarterly, October 1995, 3–18.
2. Meadow, Charles T. "Address data Information Retrieval System [San Diego, Calif.]." *Academic Press* 1992.

Having set forth the nature of the present invention, what is claimed is:

1. A system for efficiently accessing affiliated address sites, comprising:
    a. an input-output subsystem for receiving affiliated address data from a network gateway;
    b. a subject processor operatively connected to said input-output subsystem for initial processing of said received affiliated address data;
    c. a network address sub-processor operatively connected to said subject processor for classifying processed affiliated address data; and,
    d. at least one memory subsystem operatively connected to said subject processor and said network address sub-processor for holding an affiliated address control program that executes processing routines for said system.

2. A system as recited in claim 1, further comprising an array referrer operatively connected to said subject processor.

3. A system as recited in claim 1, further comprising an output device operatively connected to said input-output subsystem for communicating processed affiliated address data and system mode status information to a user.

4. A system as recited in claim 1, wherein said subject processor and said network address sub-processor comprise a single processing subsection and wherein said memory subsystem resides within said processing subsection.

5. A system as recited in claim 4, wherein memory subsystem includes means for instructing said processing subsection to find a Fourier frequency in said affiliated address input data.

6. A system as recited in claim 5, wherein memory subsystem includes means for training said processing subsection through user navigation actions.

7. A system as recited in claim 5, further including means for detecting abnormal affiliated address configurations.

8. A system as recited in claim 7, wherein said detection means comprises a fuzzy transform algorithm.

9. A system as recited in claim 2, further comprising a genetic algorithm executed by said address sub-processor for assigning node address values to data held by said array referrer.

10. A system as recited in claim 4, wherein said processing subsection is implemented in computer readable program code means.

11. A system as recited in claim 1, wherein said system is a portable wireless device in wireless communication with said gateway.

12. A system as recited in claim 2, wherein said system further comprises a display device for communicating affiliated address information to a user.

13. A system for efficiently accessing affiliated address sites, comprising:
    a. means for receiving affiliated address input data from a gateway;
    b. means for communicating affiliated address information processed by said system to a user;
    c. means operatively connected to said receiving means for initially processing said received affiliated address data;

d. means operatively connected to said initial processing means for classifying said processed affiliated address data; and, e. means operatively connected to said initial processing means and said classifying means for holding processing instructions for said system.

14. A system as recited in claim 13, wherein said classifying means comprises a network address sub-processor.

15. A system as recited in claim 13, wherein said receiving means comprise an input-output subsystem.

16. A system as recited in claim 13, further including means operatively connected to said initial processing means for recording historical navigation results.

17. A system as recited in claim 16, wherein said recording means comprises an array referrer.

18. A system as recited in claim 17, wherein said initial processing means executes a Fourier transform function to generate remote address locators for said input data.

19. A system as recited in claim 18, wherein said initial processing means and said classifying means are implemented in programmable firmware.

20. A system as recited in claim 13, wherein said receiving means includes means for wirelessly communicating to a network gateway.

21. A system as recited in claim 20, further including means for assigning node address values to said classifying means, and wherein node assigning means comprises a genetic algorithm executed by said classifying means.

22. A method for efficiently accessing affiliated address sites, comprising the steps of:

a. receiving affiliated address site data;

b. generating locator data associated with said received affiliated address site data;

c. analyzing said locator data and producing a set of sample values;

d. classifying said sample values in accordance with pre-established classification rules; and, e. communicating classified affiliated address site data to a user.

23. The method as recited in claim 22, further including the step of implementing a control interface analysis before said analyzing step.

24. The method as recited in claim 23, wherein said analyzing step comprises applying a Fourier transform to said locator data.

25. The method as recited in claim 24, further including the step of normalizing said sample values after said step of applying a fast Fourier transform to said locator data.

26. The method as recited in claim 25, further including the step of scaling said sample values prior to said classification step.

27. The method as recited in claim 24, wherein said receiving step comprises receiving said data from a wireless gateway.

28. The method as recited in claim 27, wherein said step of applying a Fourier transform to said locator data comprises applying a Tukey Fourier transform.

29. A method for top level procedural user interfacing in a system for efficiently accessing affiliated address sites, comprising the steps of:

a. loading selected user options;

b. monitoring a data input device for received affiliated address data;

c. receiving said affiliated address data;

d. applying appropriate affiliated address processing functions to said affiliated address data;

e. generating a list of affiliated address sites to a user.

30. A method as recited in claim 29, further including while monitoring for received input data the steps of:

a. updating a mode status flag;

b. conducting a battery test; and, c. updating clock and data timers.

31. A method as recited in claim 29, wherein said step of applying appropriate affiliated address processing functions to said affiliated address data includes the step of determining an applicable system operating mode.

32. A method as recited in claim 29, wherein said method is performed iteratively to provide a continuous interface to a user.

* * * * *